(12) United States Patent
Naito et al.

(10) Patent No.: US 9,094,622 B2
(45) Date of Patent: Jul. 28, 2015

(54) INFORMATION PROCESSING APPARATUS, FAX RECEPTION NOTIFICATION CONTROL METHOD, AND STORAGE MEDIUM FOR RECEIVING A RECEPTION NOTIFICATION OF FAX INFORMATION BY AN INFORMATION PROCESSING APPARATUS

(75) Inventors: Yosui Naito, Kawasaki (JP); Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/537,926

(22) Filed: Jun. 29, 2012

(65) Prior Publication Data

US 2013/0010328 A1 Jan. 10, 2013

(30) Foreign Application Priority Data

Jul. 4, 2011 (JP) ................................ 2011-148541

(51) Int. Cl.
*G06F 3/12* (2006.01)
*H04N 1/327* (2006.01)

(52) U.S. Cl.
CPC ....... *H04N 1/32704* (2013.01); *H04N 1/32719* (2013.01); *H04N 2201/3205* (2013.01); *H04N 2201/3207* (2013.01); *H04N 2201/3209* (2013.01)

(58) Field of Classification Search
USPC .............. 358/1.14, 1.15, 400, 402, 403, 468; 370/225; 379/100.17; 719/313
See application file for complete search history.

(56) References Cited

U.S. PATENT DOCUMENTS

| 6,885,469 | B1 * | 4/2005 | Tanimoto | 358/1.14 |
| 2006/0066895 | A1 * | 3/2006 | Tonami et al. | 358/1.15 |
| 2007/0279698 | A1 * | 12/2007 | Ichiki | 358/400 |
| 2007/0285734 | A1 * | 12/2007 | Matsueda et al. | 358/468 |
| 2009/0213435 | A1 * | 8/2009 | Cohen | 358/402 |

FOREIGN PATENT DOCUMENTS

| JP | 2002-158823 A | 5/2002 |
| JP | 2007324946 A | * 12/2007 |
| JP | 2010-087644 A | 4/2010 |

* cited by examiner

*Primary Examiner* — David S Cammack
(74) *Attorney, Agent, or Firm* — Canon USA Inc. IP Division

(57) ABSTRACT

An information processing apparatus receives a reception notification of FAX information from a FAX client that receives the FAX information from a FAX server that receives the FAX information via a network. The information processing apparatus monitors the FAX client, reads address information of the FAX server from a storage unit when the information processing apparatus determines from a monitoring result that the FAX client is not operated, and sends address information of the information processing apparatus and address information of the FAX client to the FAX server.

10 Claims, 14 Drawing Sheets

FIG. 4

| CORRESPONDENCE TABLE BETWEEN PC AND FAX CLIENT | | |
|---|---|---|
| PC ADDRESS | 172.24.xxx.vvv | 400 |
| FAX CLIENT ADDRESS | 172.24.xxx.zzz | 401 |

FIG. 10

| CORRESPONDENCE TABLE BETWEEN PC AND FAX CLIENT ||
|---|---|
| PC ADDRESS | FAX NO. OF SENDING SOURCE |
| 172.24.xxx.yyy | 3273 |
| 172.24.vvv.zzz | 8912 |
| 172.24.xxx.zzz | 2508 |

INFORMATION PROCESSING APPARATUS, FAX RECEPTION NOTIFICATION CONTROL METHOD, AND STORAGE MEDIUM FOR RECEIVING A RECEPTION NOTIFICATION OF FAX INFORMATION BY AN INFORMATION PROCESSING APPARATUS

BACKGROUND OF THE INVENTION

1. Field of the Invention

The present invention relates to an information processing apparatus, a FAX reception notification control method, and a storage medium.

2. Description of the Related Art

Currently, ordering contents are often sent by facsimile (FAX). Preferably, a user who recognizes the ordering contents does the next action shortly thereafter. Hence, there is a demand to send a reception notification from a multi function peripheral (MFP) to a personal computer (PC) to enable a user to recognize the reception of a FAX document (FAX data).

According to conventional art, an MFP that receives a FAX document notifies a PC of the reception via a network (refer to Japanese Patent Application Laid-Open No. 2002-158823). A user who works in front of the PC receives the notification, and immediately acquires a sheet (or an FAX document stored in a memory) on which contents of the FAX document are printed by the MFP.

Meanwhile, there is appearing a case where a FAX client-server configuration is set and used, in place of providing a FAX function to all MFPs, in order to reduce MFP introduction costs or public line contract costs. In the configuration of the FAX client-server, a FAX client without a FAX function can send and receive FAX via a FAX server having the FAX function by connecting a plurality of FAX clients without the FAX function to the FAX server via a network.

In the configuration, an address of the FAX server is registered in advance to the FAX client, and a FAX document (document data) is sent to the FAX server from the FAX client together with a telephone number of another party to be connected, via the network. The FAX server that receives the FAX document sends the data by FAX to the telephone number of another party via a public network, thereby realizing the FAX function.

On the other hand, in a case of receiving FAX, the FAX server receives the FAX document from an apparatus of another party via the public network. Further, the FAX document received by the FAX server is transferred to the FAX client by a protocol such as a simple mail transfer protocol (SMTP) via the network. By providing setting information for transfer according to a condition (e.g., telephone number of another party) when the FAX document is received on the FAX server side, the FAX document is sent to the FAX client.

According to the conventional art, when the MFP for storing the FAX document receives the FAX document, it triggers transmission of a reception notification to the PC.

However, in the configuration of the FAX client-server, when the FAX client that stores the FAX document is down for some reason, although the FAX server receives the FAX document, the FAX document is not transferred to the FAX client. According to the conventional art, if the FAX client is down, a reception notification thereof is not sent to the PC. However, the reception has normally ended on the FAX server side. Therefore, the source of the FAX document erroneously recognizes that the FAX document is normally sent to another party side (FAX client on the reception side).

More specifically, the FAX client on the reception side cannot receive the FAX document, and does not send the reception notification. A user on the reception side does not consequently know that the FAX document is sent. When the sent FAX document contains contents such as a purchase order, the user delays in taking the required action for the order, thereby causing a trouble.

Further, according to the conventional art, a method of a reception notification is not described in a system having the configuration of the FAX client-server. The conventional art does not correspond to the above-mentioned case. In other words, if the FAX document is managed via a plurality of apparatuses, the reception notification of the FAX document cannot be sent to an information processing apparatus of a user.

SUMMARY OF THE INVENTION

The present invention is directed to control for properly receiving a reception notification of FAX information by an information processing apparatus.

According to an aspect of the present invention, an information processing apparatus receives a reception notification of FAX information from a FAX client that receives the FAX information from a FAX server that receives the FAX information via a network. The information processing apparatus includes a monitoring unit configured to monitor the FAX client, and a sending unit configured to read address information of the FAX server from a storage unit when it is determined that the FAX client is not operated from a monitoring result of the monitoring unit and send address information of the information processing apparatus and address information of the FAX client to the FAX server. The FAX server issues a reception notification of the FAX information to be transferred to the FAX client to the information processing apparatus, based on the address information of the information processing apparatus received from the information processing apparatus and the address information of the FAX client.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a table according to the first exemplary embodiment.

FIG. 10 illustrates an example of a list according to the second exemplary embodiment.

DESCRIPTION OF THE EMBODIMENTS

Various exemplary embodiments, features, and aspects of the invention will be described in detail below with reference to the drawings.

The exemplary embodiments do not limit the present invention. The entire configurations according to the exemplary embodiments are not necessarily essential means for solving the problem of the present invention.

According to the first exemplary embodiment of the present invention, a description is given of a reception notification (FAX reception notification control method) of a FAX document to a personal computer (PC) 104 in a configuration of a FAX client-server (FAX system) including a FAX server 102, a plurality of FAX clients 100, and the PC 104.

Figure 1:
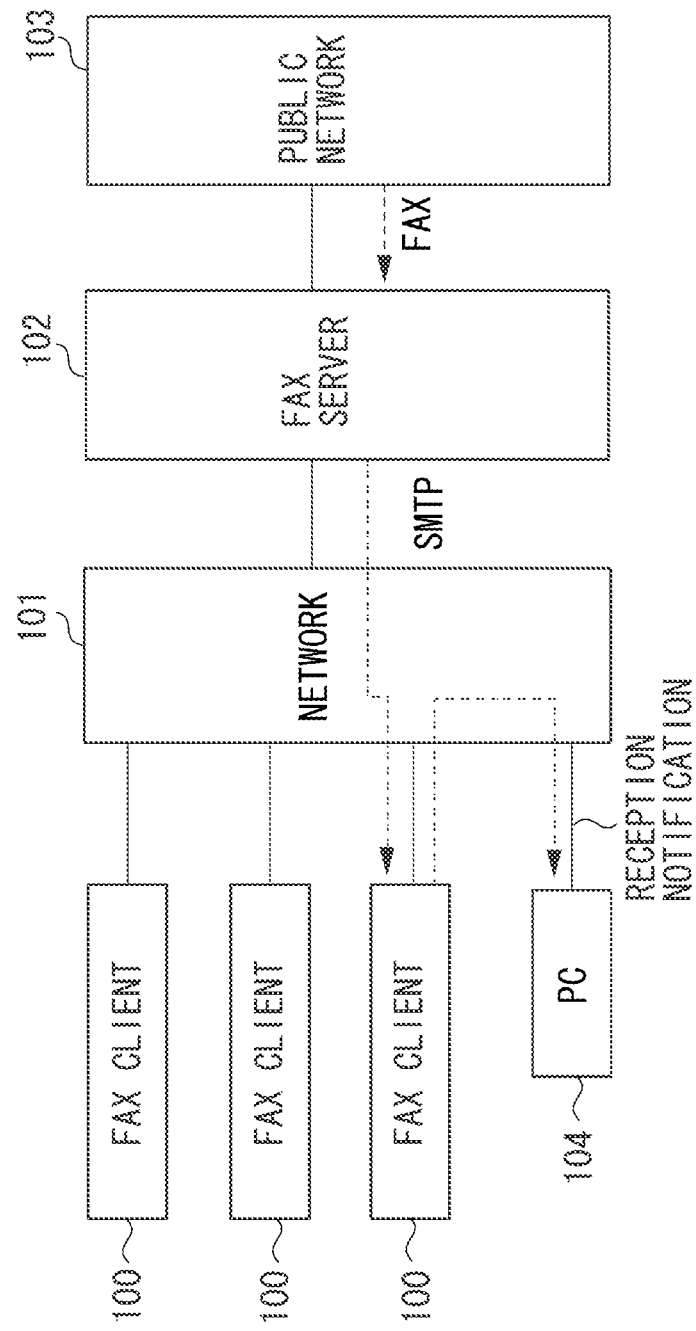
FIG. 1 illustrates an example of a reception notification path according to the first exemplary embodiment of the present invention.

Referring to FIG. 1, in the FAX system, the plurality of FAX clients 100, the FAX server 102, and the PC 104 are communicably connected to each other via a network 101. Further, the FAX server 102 is connected to a public network 103 as a network example to enable sending and reception of a FAX document (FAX information) to/from an apparatus connected to the public network 103. The FAX client 100, the FAX server 102, and the PC 104 are only examples of an information processing apparatus (computer).

In order to send a reception notification of the FAX document to the PC 104 when the FAX document is received by an MFP (FAX client 100 or FAX server 102), an address (address information) of the PC 104 as a reception notification target needs to be registered in the MFP. Therefore, a user performs an operation (setting operation of the reception notification) for registering an address of the user apparatus in the MFP as a monitoring target from the PC 104. The setting operation of the reception notification can be realized by a known method.

If the configuration of the FAX client-server is adopted, by firstly designating the FAX server 102 and registering the address of the PC 104, the reception notification can be issued, even though the FAX client 100 is down.

However, when the FAX client 100 is not down, the FAX document is not normally stored in the FAX server 102. Therefore, even if setting information of the reception notification is first registered in the FAX server 102, a message of the reception notification from the FAX server 102 does not indicate the position of the FAX document.

In addition, it may be troublesome for the user to search an address of the FAX server 102, unlike the FAX client 100 near the user. As a consequence, in the configuration of the FAX client-server, it is insufficient to firstly register the setting information of the reception notification in the FAX server 102, as a solving method.

According to the present exemplary embodiment, the user registers in advance the address of the user apparatus in the FAX client 100 as the source of the reception notification from the PC 104. In this case, the PC 104 acquires and stores the address of the FAX server 102 registered in the FAX client 100. Then, the PC 104 enters a standby status to receive notification from the FAX client 100, and monitors a status of the FAX client 100 during the standby status.

When it is detected that the FAX client 100 is down by monitoring the status, the PC 104 refers to the stored address of the FAX server 102, and is operated to register the address of the user apparatus in the FAX server 102 (automatic switching of the reception notification destination).

On the other hand, if the address of the PC 104 as a reception notification target is registered in the FAX server 102 and a transfer error to the FAX client 100 occurs, the reception notification is sent to the address of the PC 104. In this state, the reception notification of all FAX documents whose transfer error occurs is sent to the address of the PC 104. When registering the address of the PC 104 in the FAX server 102, the PC 104 also registers the address of the FAX client 100 in the FAX server 102 which has been the reception notification source. As a result, if the sending destination of the FAX document whose transfer is an error matches the registered address of the FAX client 100, the FAX server 102 can send the reception notification only to the PC 104 to the matching address.

After the automatic switching of the reception notification destination, the PC 104 continuously monitors the status of the FAX client 100 to make detection when the FAX client 100 is reset. If the PC 104 detects that the FAX client 100 is reset, the PC 104 requests the reset of the reception notification to the FAX server 102 (issuing a resetting notification). If the FAX server 102 receives the resetting request, information (address, etc.) on the PC 104 is deleted, and the reception notification to the address will not be sent thereafter.

A more detailed description is given of the reception notification. Usually, there are a case of automatically printing the FAX document and a case of storing the FAX document in a memory in an MFP main body after the MFP acquires the FAX document. There is also a case of transferring the FAX document to another party. However, the MFP does not handle the FAX document in this case. Therefore, the last case is not described.

The MFP has setting information indicating the operations performed according to the application of the user, depending on the cases. Depending on the two cases, the MFP changes a message of the reception notification so that the user smoothly takes the received FAX document as follows.

Case of automatically printing FAX document
A message includes a setting place of the MFP so that the user can fetch a printed sheet.

Case of storing FAX document in memory
A message includes an address of the storage destination so that the user acquires the FAX document from the PC 104.

FIG. 1 illustrates a reception notification path in a status (operating status) in which the FAX client 100 is not down. If the FAX client 100 is not down, the FAX document received by the FAX server 102 is transferred to the FAX client 100 via the network 101 by a protocol such as a simple mail transfer protocol (SMTP). The FAX client 100 sends the reception notification to the PC 104 in response to the transfer.

Figure 2:
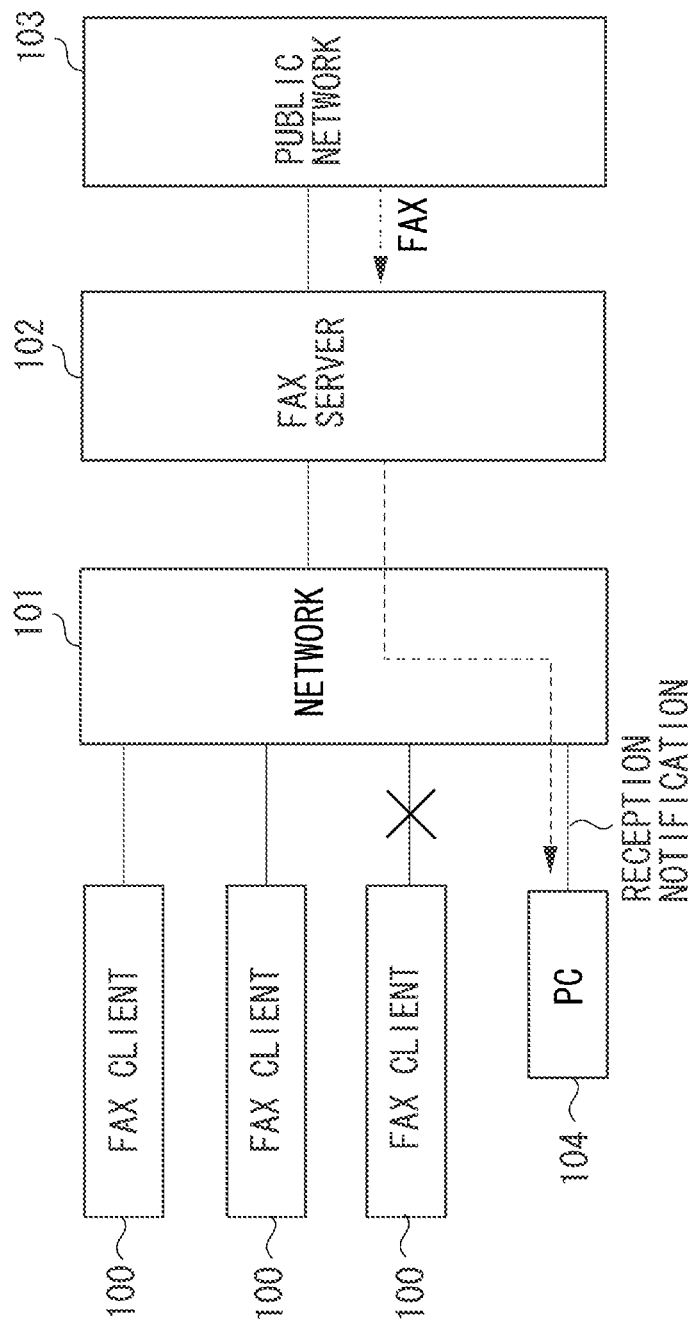
FIG. 2 illustrates another example of the reception notification path according to the first exemplary embodiment.

FIG. 2 illustrates the reception notification path when the FAX client 100 is down. In this case, the FAX document received by the FAX server 102 is not transferred to the FAX client 100, but is stored in the memory in a main body of the FAX server 102. The FAX document can also be printed. The reception notification is sent to the PC 104 from the FAX server 102.

Figure 3:
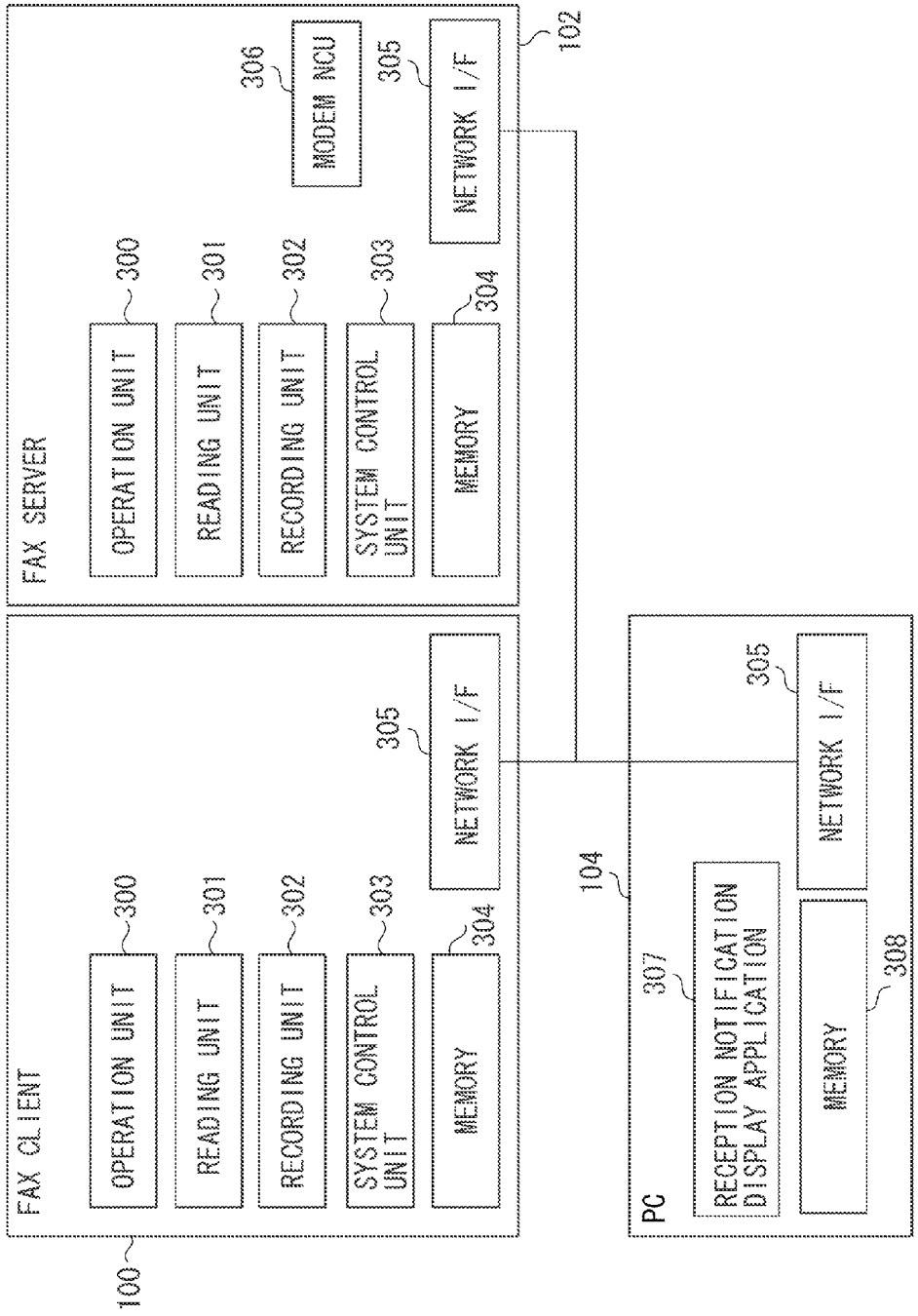
FIG. 3 illustrates examples of configurations of apparatuses according to the first exemplary embodiment.

FIG. 3 illustrates examples of configurations of the FAX client 100, the FAX server 102, and the PC 104. The same configuration is designated by the same reference numeral and a description thereof is appropriately omitted.

An operation unit 300 includes a keyboard and a display unit, and receives an operation for inputting various setting information by an operator. A reading unit 301 performs coding processing of image data used by an image forming apparatus (not illustrated). A recording unit 302 records the received image or file data in a recording medium such as a sheet. A system control unit 303 controls the entire apparatus.

A memory 304 is a storage area for storing various control programs, the received FAX document, and the setting information of the apparatus. For example, the memory 304 of the FAX client 100 stores the address of the FAX server 102 and the address of the PC 104 as the reception notification target. The memory 304 of the FAX server 102 stores a transfer condition of the FAX document and a correspondence table in FIG. 4.

A network interface 305 communicates data with the network 101. A modem/network control unit (NCU) 306 demodulates a modulated signal from a public line, or modulates a signal from the apparatus and sends the modulated signal to the public line. A network control unit (NCU) is an interface between a telephone line and the FAX, and detects a signal from the telephone line and sends the detected signal to the modem, or controls the public line to switch the public line to the FAX or the telephone.

A reception notification display application 307 displays the reception notification sent from the MFP on the PC 104, and registers the setting information of the reception notification in the MFP in response to the user operation. A memory 308 is a storage area that stores various data, and stores the address of the FAX client 100 on the reception notification source and the address of the FAX server 102 acquired from the MFP that registers the setting information of the reception notification.

A central processing unit (CPU) of the PC 104 performs processing according to a program sequence stored in the memory 308, thereby realizing the function of the PC 104 and processing in flowcharts. A CPU of the MFP performs processing according to the program sequence stored in the memory 304, thereby realizing the function of the MFP and processing in the flowcharts. A function of the apparatus and a part or all of the processing in the flowcharts may be configured with dedicated hardware.

FIG. 4 illustrates an example of a table (correspondence table between the PC and the FAX client) stored in the memory 304 of the FAX server 102. The correspondence table between the PC and the FAX client stores information notified from the PC 104 in the FAX server 102 when the PC 104 detects that the FAX client 100 is down. Specifically, the correspondence table between the PC and the FAX client stores address information of an address 400 of the PC 104 and an address 401 of the FAX client 100 monitored by the PC 104 in association with each other. The FAX server 102 determines the communication and PC 104 to which the reception notification is sent, based on the correspondence table between the PC and the FAX client.

Figure 5:
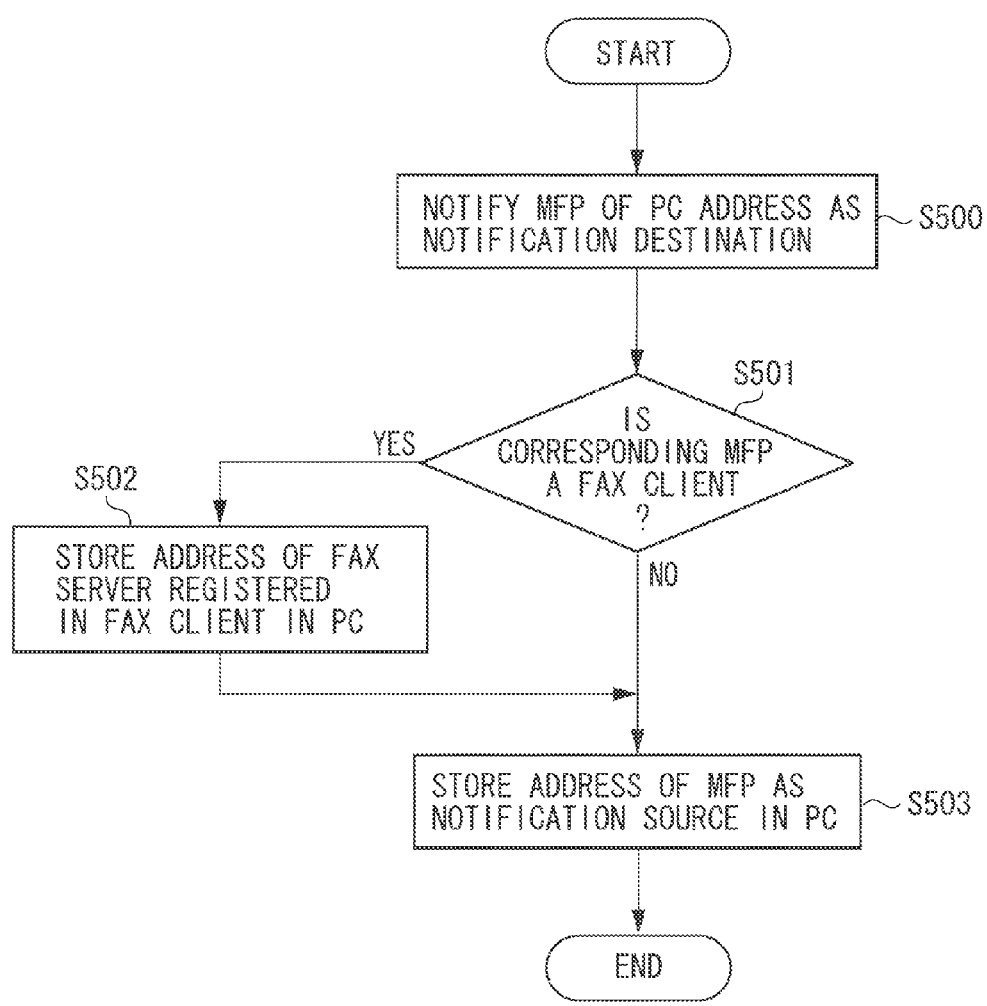
FIG. 5 illustrates an example of a flowchart for processing relating to a reception notification according to the first exemplary embodiment.
Figure 6:
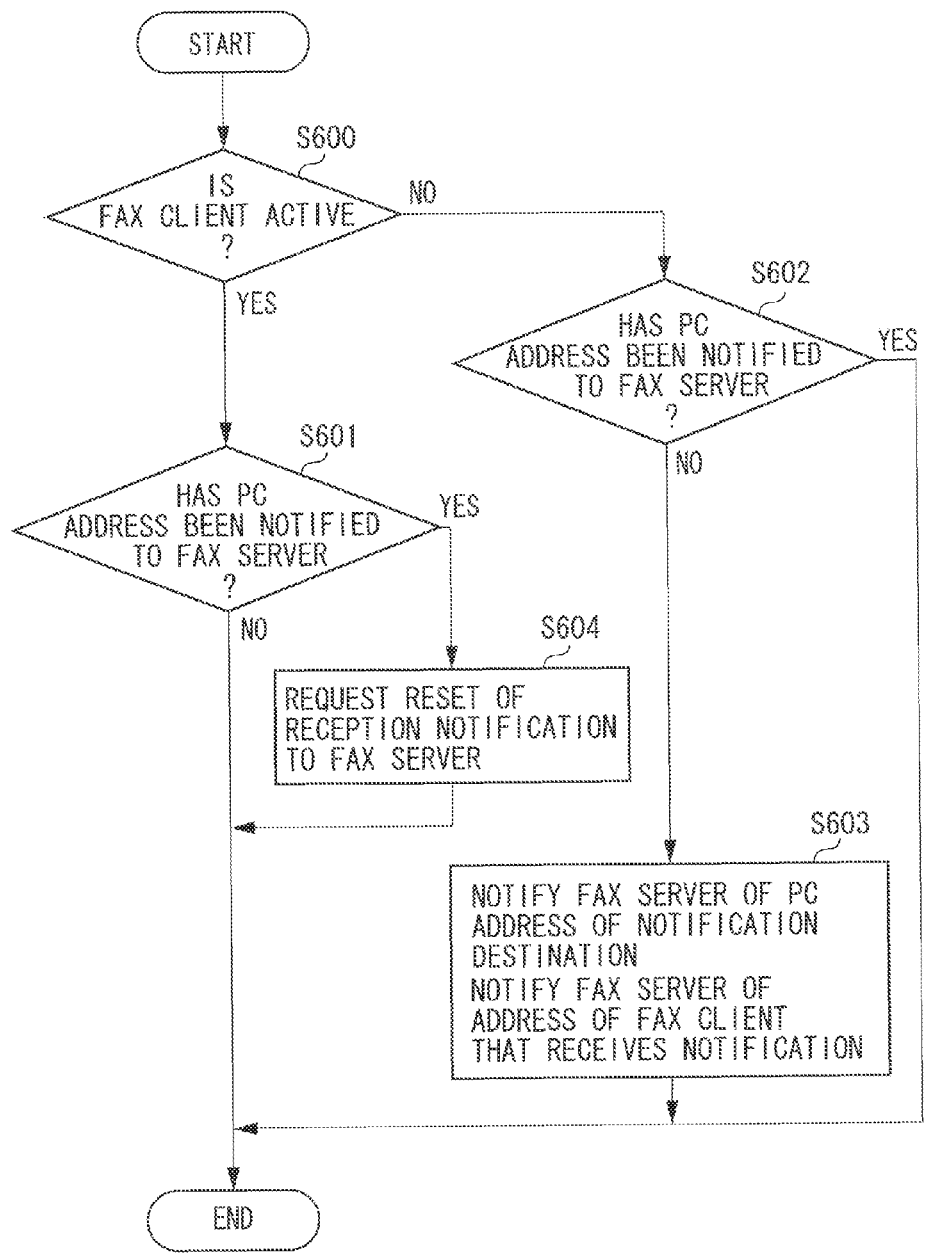
FIG. 6 illustrates an example of a flowchart for status monitoring processing according to the first exemplary embodiment.
Figure 7:
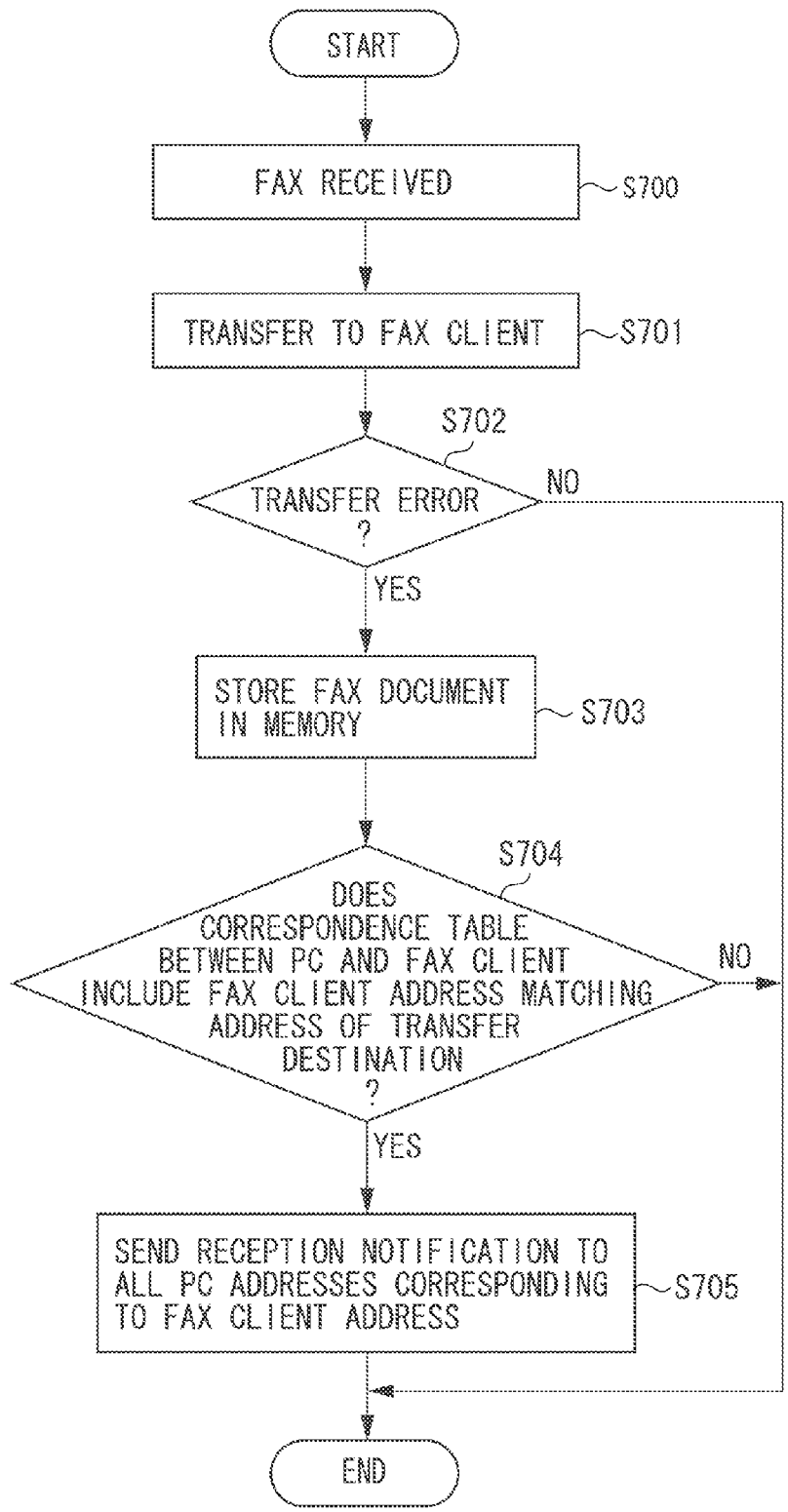
FIG. 7 illustrates an example of a flowchart for processing performed when FAX is received according to the first exemplary embodiment.

A description is given of an operation according to the present exemplary embodiment with reference to FIGS. 5 to 7. FIG. 5 illustrates an example of a flowchart for processing (processing relating to the reception notification) in which the PC 104 sends and receives the information on the reception notification to/from the MFP.

The setting information of the reception notification has to be registered in advance in the MFP from the PC 104 (such as setting operation of the reception notification) in order to receive the reception notification by the PC 104 as above described. According to the present exemplary embodiment, the setting information of the reception notification is manually input to the FAX client 100 via the reception notification display application 307 executed on the PC 104. An example of the processing is illustrated in FIG. 5.

A hard disk (HD) (memory 308) in the PC 104 stores the program in the flowcharts in FIGS. 5 and 6 and data required to execute the program. The CPU in the PC 104 reads the program or data to a random access memory (RAM) (memory 308). The CPU of the PC 104 executes the program or data, thereby realizing the reception notification display application 307.

In step S500, the reception notification display application 307 notifies the FAX client 100 of the address of the PC 104. In step S501, the reception notification display application 307 determines whether the target MFP is the FAX client 100. If the reception notification display application 307 determines that the MFP target is the FAX client 100 (YES in step S501), the processing shifts to step S502. If the reception notification display application 307 determines that the target MFP is not the FAX client 100 (NO in step S501), the processing shifts to step S503.

In step S502, the reception notification display application 307 acquires the address of the FAX server 102 registered in the memory 304 in the MFP, and stores the acquired address in the memory 308 in the PC 104. In step S503, the reception notification display application 307 stores, in the memory 308 in the PC 104, the address of the MFP that sends the notification of the address of the PC 104.

The reception notification display application 307 shifts to a reception standby status to wait for a FAX reception notification, and performs processing (status monitoring processing) for monitoring a status of the FAX client 100. FIG. 6 illustrates an example of a flowchart of the status monitoring processing.

First, in step S600, the reception notification display application 307 determines whether the FAX client 100 is active as a monitoring target (in an operating status). If the reception notification display application 307 determines that the FAX client 100 as the monitoring target is active (YES in step S600), the processing shifts to step S601. If the reception notification display application 307 determines that the FAX client 100 is not active (NO in step S600) as the monitoring target, the processing shifts to step S602.

In step S601, the reception notification display application 307 determines whether the address of the apparatus has been already notified to the FAX server 102. If the reception notification display application 307 determines that the address has been already notified (YES in step S601), the processing shifts to step S604. If the reception notification display application 307 determines that the address has not been notified (NO in step S601), the processing ends.

In the initial status, the reception notification display application 307 determines that the address has not been notified (NO in step S601), the processing ends, and the processing is back to start again.

In step S604, the reception notification display application 307 requests the reset of the reception notification to the FAX server 102. The FAX server 102 deletes the data corresponding to the PC 104 from the correspondence table between the PC and the FAX client stored in the memory 304 in response to the resetting request.

In step S602, the reception notification display application 307 determines whether the address of the apparatus has been already notified to the FAX server 102. If the reception notification display application 307 determines that the address has been already notified (YES in step S602), the processing ends. If the reception notification display application 307 determines that the address has not been notified yet (NO in step S602), the processing shifts to step S603.

In step S603, the reception notification display application 307 sends the address 400 of the PC 104 and the address 401 of the FAX client 100 as the monitoring target to the FAX server 102. The FAX server 102 adds the information to the correspondence table between the PC and the FAX client provided in the memory 304 of the MFP.

The FAX server 102 sends the reception notification to the PC 104 based on information in the correspondence table between the PC and the FAX client in processing in a flowchart in FIG. 7. Before the processing is performed in step S603, in the processing in step S602, the reception notification display application 307 determines whether the address has been already notified to the FAX server 102 to avoid the overlapped sending of the information.

The reception notification display application 307 continues to monitor the status of the FAX client 100 to detect recovery of the FAX client 100 after once detecting that the FAX client 100 is not active (that is, in the down status). If the reception notification display application 307 detects that the FAX client 100 is active (reset) after the notification is made to the FAX server 102 (YES in step S600), in processing in step S604, the reception notification display application 307 requests the reset of the reception notification to the FAX server 102. As a result, the FAX server 102 does not send the reception notification to the PC 104 after the FAX client 100 is recovered.

A description is given of processing (processing at the FAX reception time) when the FAX server 102 receives the FAX document, with reference to FIG. 7. FIG. 7 illustrates an example of a flowchart of the processing at the FAX reception time.

A hard disk (HD) (memory 304) of the FAX server 102 stores a program of the flowchart in FIG. 7 and data required for executing the program, and the CPU of the FAX server 102 reads the program and data to the random access memory (RAM) (memory 304). The program is executed by the CPU of the FAX server 102, thereby realizing the function of the FAX server 102.

In step S700, the FAX server 102 receives the FAX document. In step S701, the received FAX document is transferred to the FAX client 100 under a transfer condition registered in the memory 304 in the FAX server 102. In step S702, the FAX server 102 determines whether there is a transfer error. If the FAX server 102 determines that there is the transfer error (YES in step S702), the processing shifts to step S703. If the FAX server 102 determines that there is not the transfer error (NO in step S702), the processing ends.

In step S703, the FAX server 102 stores the received FAX document in the memory 304 of the FAX server 102. Depending on the setting information, the received FAX document can be printed. In step S704, the FAX server 102 makes a search to determine whether the correspondence table between the PC and the FAX client stored in the memory 304 includes the address 401 of the FAX client 100 identical to the address of the transfer destination. If the FAX server 102 finds that the correspondence table between the PC and the FAX client does not include the address 401 (NO in step S704), the processing ends. If the FAX server 102 finds that the correspondence table between the PC and the FAX client includes the address 401 (YES in step S704), the processing shifts to step S705.

In step S705, the FAX server 102 sends the reception notification to the addresses 400 of all personal computers (PCs) corresponding to the address 401 of the FAX client 100 identical to the address of the transfer destination.

A description is given of a message example of the reception notification. The message is changed according to a method for using the FAX document in the MFP.

Case of automatically printing FAX document
(Example) 'The FAX document has been received, and the data is printed by the MFP set in an office automation (OA) corner of an office room 32'.

Case of storing FAX document in memory
(Example) 'The FAX document has been received and is stored in the main body MFP. The FAX document can be acquired from the following address. http://mfp1.aaa.co.jp/fax_doc/doc1.pdf'

In the configuration, although the FAX client 100 is down, if the FAX server 102 can receive the FAX document, the reception notification can be sent to the PC 104. The FAX server 102 sends only the reception notification of the FAX document to be transferred to the designated FAX client 100. Therefore, an unnecessary reception notification may not be sent to the PC 104. If the FAX client 100 is restored, the FAX client 100 can be subsequently automatically reset to the initial status so as not to send the reception notification from the FAX server 102 thereafter.

The message of the reception notification contains a setting place of the MFP which printed the Fax document and the address stored in the memory, so that the user easily understands where the FAX document is sent.

According to the first exemplary embodiment, if the FAX client 100 is down and the FAX server 102 then stores the received FAX document in the memory thereof or prints the document, the reception notification is properly sent to the PC. However, according to the second exemplary embodiment of the present invention, the FAX document received by the MFP (FAX client 100 or FAX server 102) is stored in a document management server and the reception notification is then sent to the PC. According to the present exemplary embodiment, a description is given of a configuration (a FAX reception notification control method) in which the reception notification is properly sent to the PC when the FAX document received by the MFP cannot be stored in the document management server. The MFP is an example of a FAX apparatus.

According to the present exemplary embodiment, the FAX document is automatically distributed within the document management server by a FAX document distribution server depending on attribute information (an example of information indicating the attribute of the FAX document) such as a FAX number of the sending source.

Figure 8:
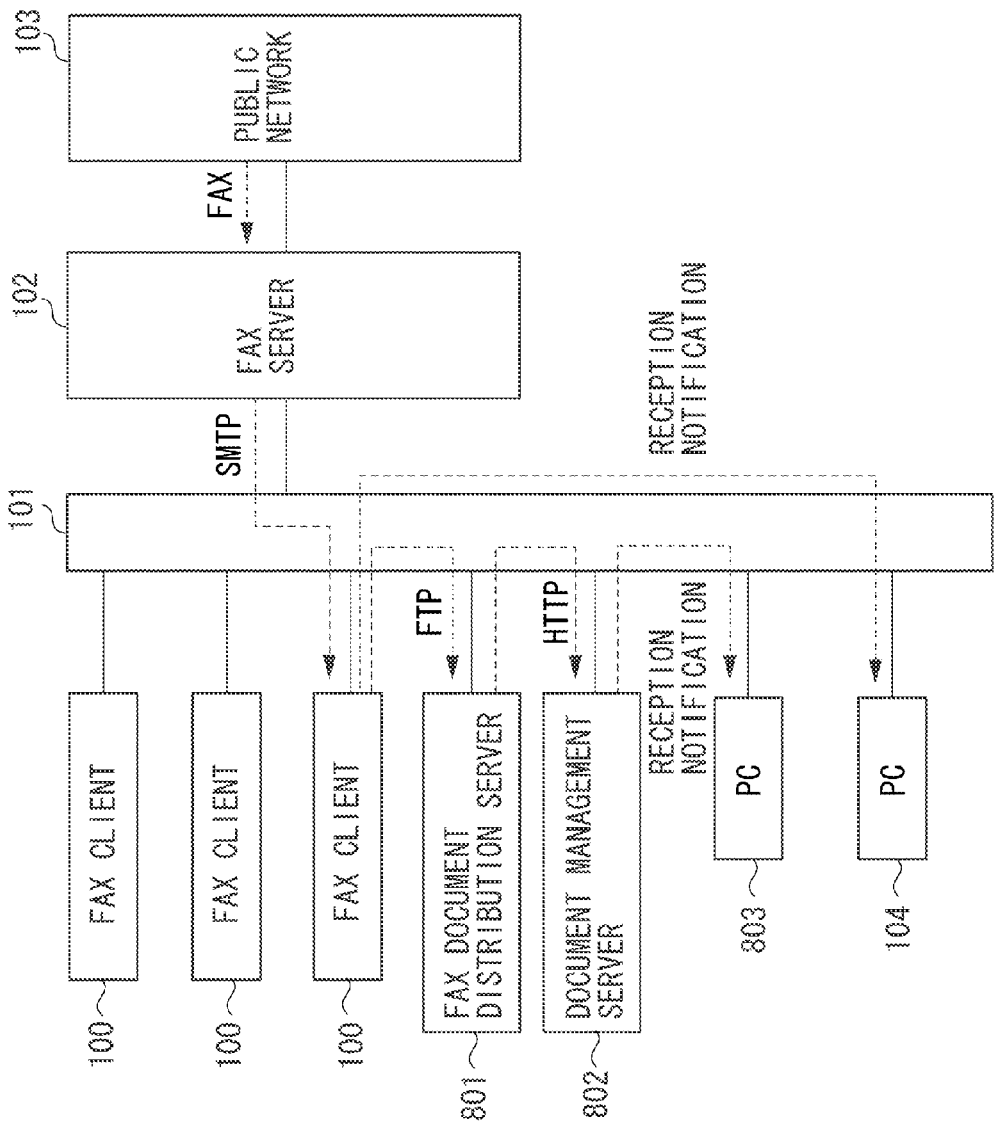
FIG. 8 illustrates an example of a reception notification path according to the second exemplary embodiment of the present invention.

FIG. 8 illustrates an example of a reception notification path. The configuration of the FAX system is described with reference to FIG. 8. The same configuration as the first exemplary embodiment is designated by the same reference numeral, and a description thereof is omitted. A protocol in FIG. 8 is an example.

A FAX document distribution server 801 is an example of a distribution apparatus, and receives the FAX document from the FAX client 100. Alternatively, the FAX document may be received from the FAX server 102.

The FAX document distribution server 801 executes image processing if necessary, sorts out the FAX documents according to the FAX number of the sending source, and sends the sorted FAX document to a document management server 802 as an example of a management apparatus. The distributed FAX document is segmented by a folder (as an example of a storage area) in the document management server 802 and is stored. The PC 104 and a personal computer (PC) 803 access the document management server 802, and view, search, and edit the FAX document.

The PC 104 receives the reception notification from the FAX client 100 similarly to the first exemplary embodiment. The reception of all FAX documents by the FAX client 100 is notified.

The personal computer (PC) 803 receives the reception notification from the document management server 802. The reception notification is issued to the distributed FAX documents. For example, the PC 803 registers setting information indicating the notification of the FAX document stored in a folder '1234' in the document management server 802. As a consequence, only the reception notification of the FAX document stored in the folder is received.

In the configuration of the FAX system, if the FAX document distribution server 801 is down by some reason, a user of the PC 803 only thinks that the FAX is not sent and does not find that the FAX document distribution server 801 is down. The PC 104 can receive the reception notification from the FAX client 100. Therefore, the user can grasp the fact that the FAX is received or the FAX document distribution server 801 is down. However, if the user of the PC 104 does not find that the FAX document distribution server 801 is down, there is a problem that the received FAX document is left.

According to the present exemplary embodiment, if the FAX document distribution server 801 is down, the FAX client 100 sends the reception notification to the PC 803 as well as the PC 104. According to the first exemplary embodiment, if the FAX client 100 is down, the FAX server 102 sends the reception notification. A description thereof is omitted in the present exemplary embodiment.

Figure 9:
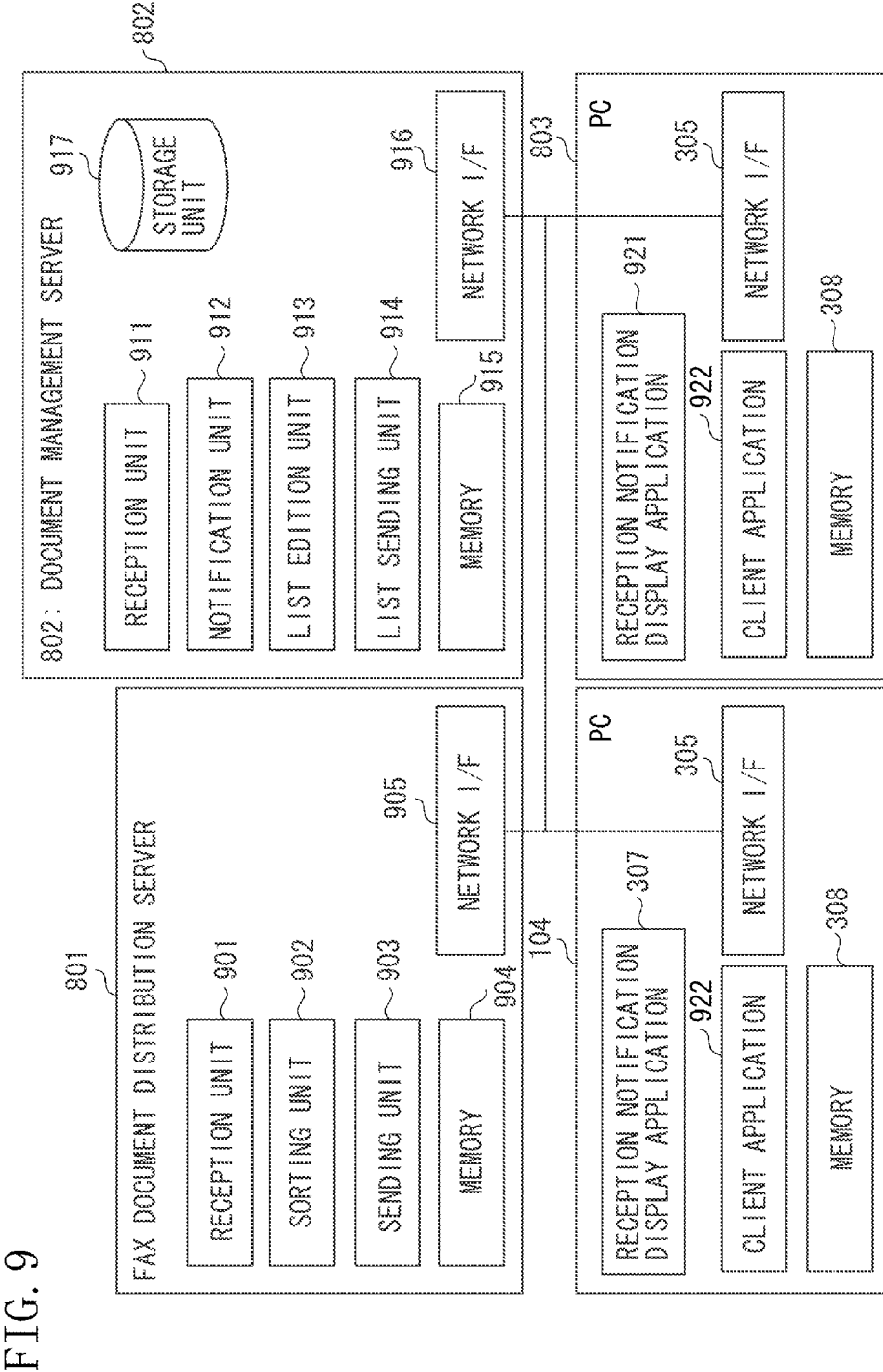
FIG. 9 illustrates examples of configurations of apparatuses according to the second exemplary embodiment.

FIG. 9 illustrates examples of configurations of the FAX document distribution server 801, the document management server 802, and the PCs 104 and 803. The configurations of the FAX client 100 and the FAX server 102 are not illustrated because the configurations are similar to those according to the first exemplary embodiment.

A reception unit 901 receives the FAX document sent from the FAX client 100. A sorting unit 902 sorts out the FAX documents according to the FAX number of the sending source. If the FAX number of the sending source is '1234', a command is issued to the document management server 802 to store the FAX document in a folder '1234' of the document management server 802.

A sending unit 903 stores the FAX document in the document management server 802. A memory 904 is a storage area for storing various data. A network interface 905 communicates data with the apparatus connected to the network 101.

A reception unit 911 receives the FAX document sent from the FAX document distribution server 801. A notification unit 912 sends a reception notification to the PC that registers the setting information of the reception notification for the received FAX document. If the PC 803 registers the setting information of the reception notification for the FAX document stored in the folder '1234', at timing of storing the FAX document in the folder '1234', the notification unit 912 notifies the PC 803 of the reception notification. The PC 803 may perform polling to monitor the folder in the document management server 802.

A list edition unit 913 creates a list of the PC that registers the setting information of the reception notification of the FAX document with a relation to the FAX number of the sending source of the FAX document. A list sending unit 914 sends the list created by the list edition unit 913 to the FAX client 100, periodically or in response to an instruction of a manager.

A memory 915 is a storage area for storing various data. The memory 915 temporarily stores the list created by the list edition unit 913. A network interface 916 communicates data with the apparatus connected to the network 101. A storage unit 917 stores distribution information of the FAX documents and notification setting information of the reception notification to the PCs.

A reception notification display application 921 displays the reception notification sent from the document management server 802 or the MFP on the PC 803.

A client application 922 accesses the document management server 802, and executes operations including registration, viewing, acquisition, edition, and search of the document.

FIG. 10 illustrates an example (correspondence table between the PC and the FAX number of the sending source) of the list created and edited by the list edition unit 913. A column 1001 indicates an address of the PC. A column 1002 indicates the FAX number of the sending source. A first record of the correspondence table between the PC and the FAX number of the sending source indicates that the reception notification of the FAX document sent from a FAX number '3273' of the sending source is sent to a PC '172.24.xxx.yyy'.

A description is given of an operation according to the present exemplary embodiment with reference to FIGS. 11 to 14. Hard disks (HDs) (memories 304, 308, 904, and 915) store programs of the flowcharts in FIGS. 11 to 14 and data required for executing the programs. Central processing units (CPUs) of the apparatuses read and execute the programs and the data on random access memories (RAMs) (memories 304, 308, 904, and 915), thereby realizing functions of the apparatuses.

Figure 11:
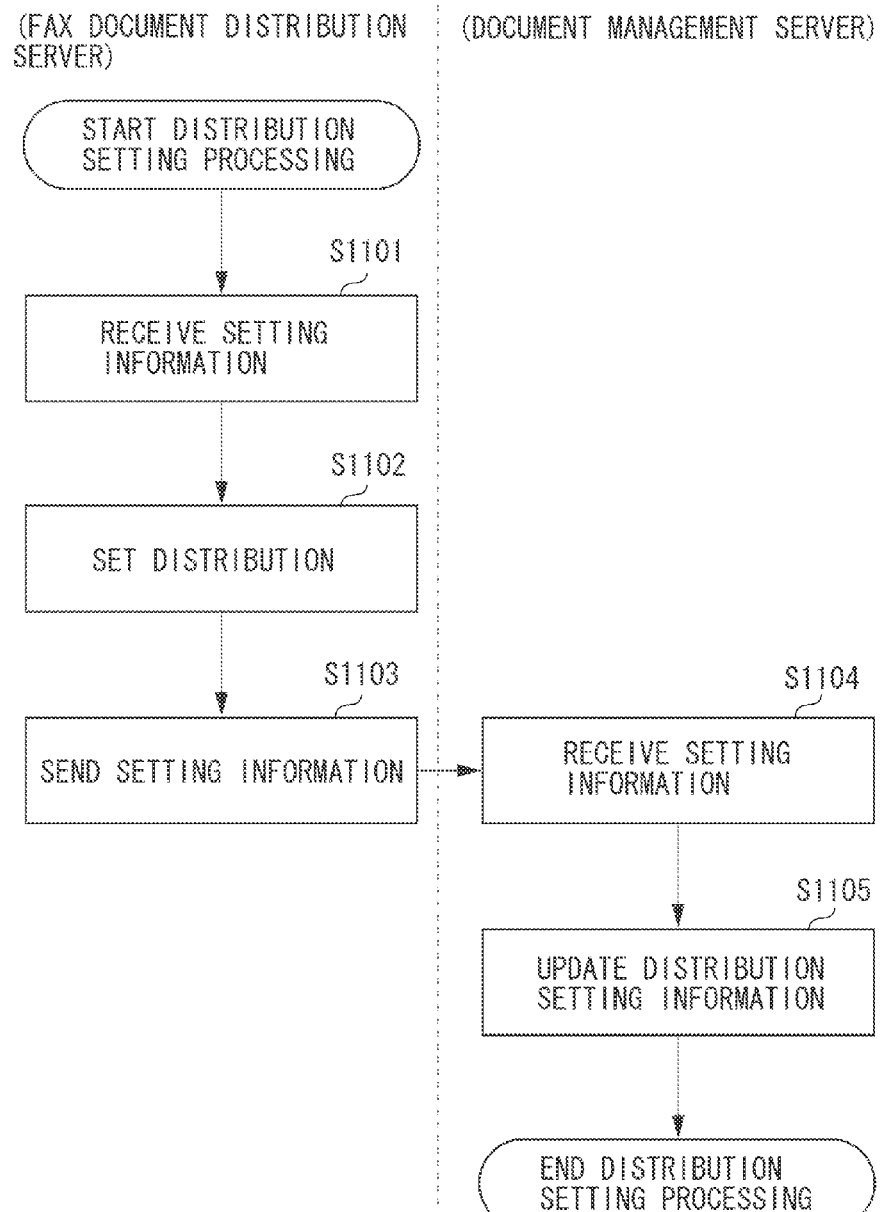
FIG. 11 illustrates an example of a flowchart for distribution setting processing according to the second exemplary embodiment.

FIG. 11 illustrates an example of a flowchart of processing (distribution setting processing) for setting (registering) the setting information used for the distribution of the FAX documents to the document management server 802 by the FAX distribution server 801.

In step S1101, the sorting unit 902 of the FAX document distribution server 801 receives an input of setting information used for distribution, from the user. As an example of the setting information, if the FAX number of the sending source of the FAX document is '1234', this means that data is stored in the folder '1234' in the document management server 802. In step S1102, the sorting unit 902 applies the received setting information, and changes the setting information to sort out the thereafter-received FAX document. In step S1103, the sending unit 903 sends the setting information to the document management server 802.

In step S1104, the reception unit 911 in the document management server 802 receives the sent setting information. In step S1105, the list edition unit 913 newly registers or updates the received setting information as distribution setting information in the storage unit 917.

Figure 12:
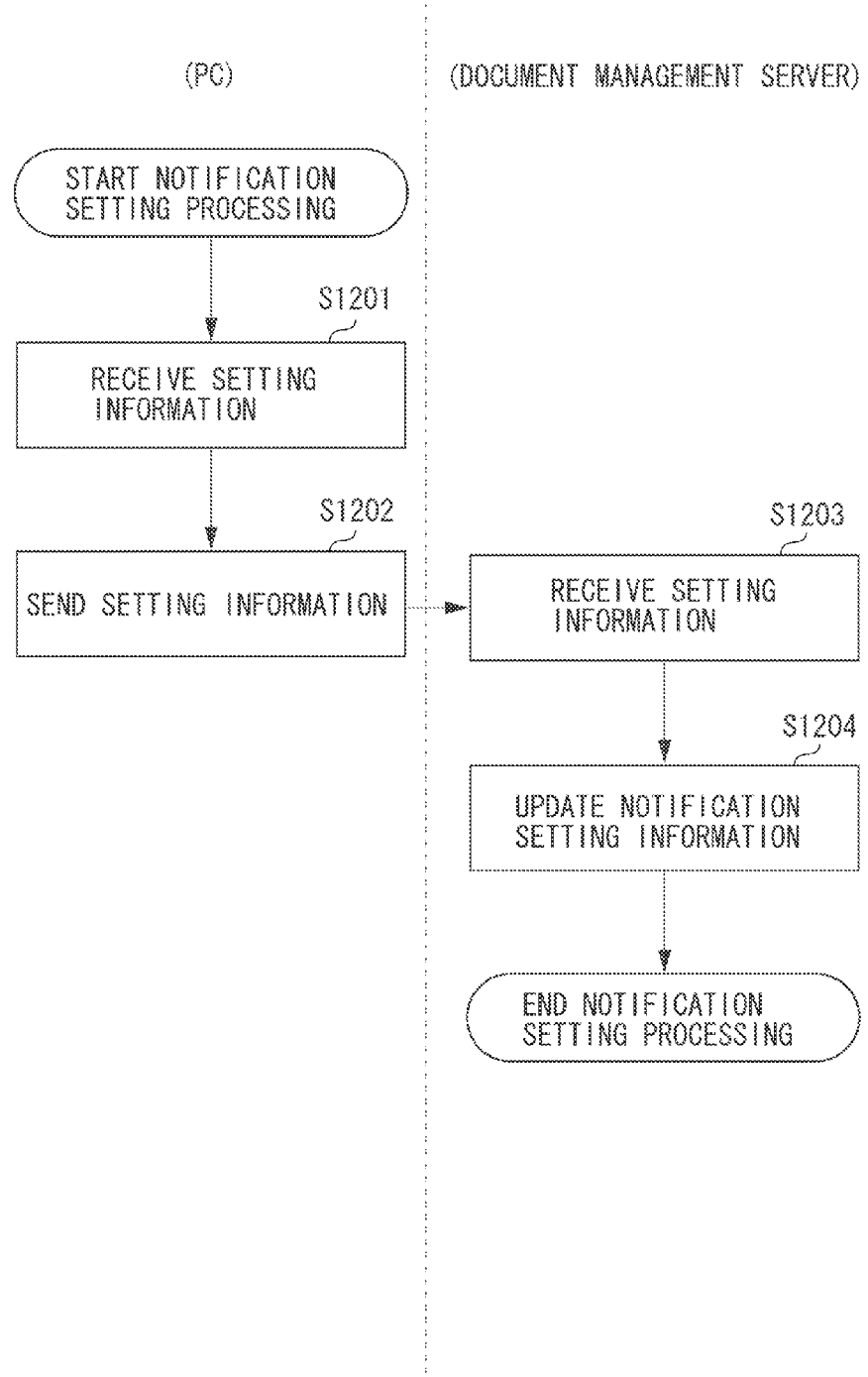
FIG. 12 illustrates an example of a flowchart for notification setting processing according to the second exemplary embodiment.

FIG. 12 illustrates an example of a flowchart for processing (notification setting processing) for setting (registering) the setting information of the reception notification of the FAX document to the document management server 802 by the PC 803. In step S1201, a client application 922 in the PC 803 receives an input of the setting information of the reception notification of the FAX document, from the user. As an example of the setting information, if the FAX document (or a general file may be used as well as the FAX document) is newly added to the folder '1234' in the document management server 802, this means that the reception notification is sent to the PC.

In step S1202, the client application 922 sends the setting information to the document management server 802. In step S1203, the reception unit 911 of the document management server 802 receives the sent setting information. In step S1204, the list edition unit 913 newly registers or updates the received setting information as notification setting information in the storage unit 917.

Figure 13:
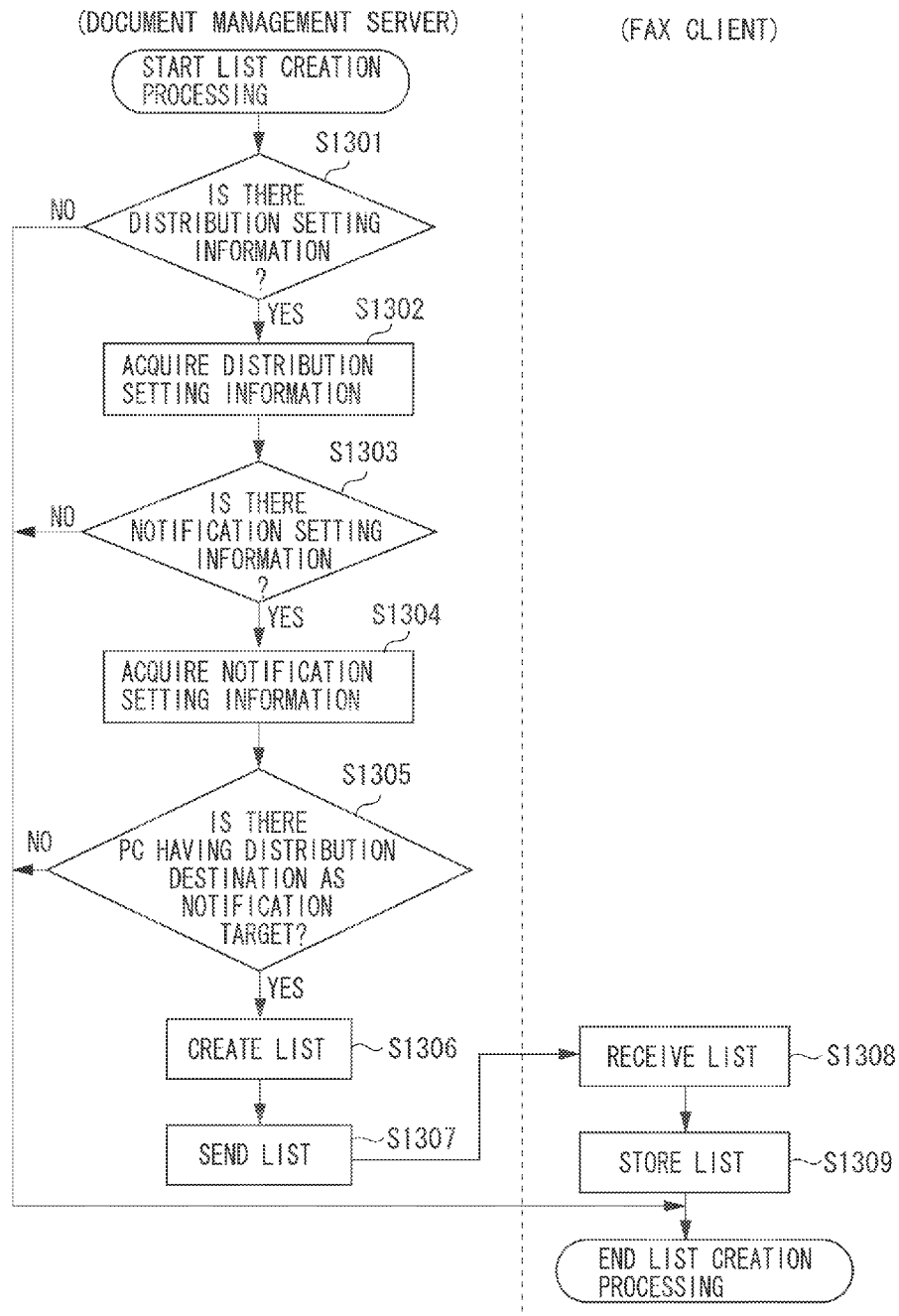
FIG. 13 illustrates an example of a flowchart for list creation processing according to the second exemplary embodiment.

FIG. 13 illustrates an example of a flowchart of processing (list creation processing) for creating the list in FIG. 10 by the list edition unit 913 in the document management server 802. The processing may be periodically executed, or may be executed at timing of executing the distribution setting processing in FIG. 11 or the notification setting processing in FIG. 12.

In step S1301, the list edition unit 913 checks whether there is the distribution setting information of the FAX documents in the storage unit 917. If the processing in FIG. 11 is executed, there is the distribution setting information of the FAX documents in the storage unit 917 (YES in step S1301). The storage unit 917 may store only data updated from the previous processing. If there is the distribution setting information of the FAX documents in the storage unit 917 (YES in step S1301), the processing advances to step S1302. If there is not the distribution setting information of the FAX documents in the storage unit 917 (NO in step S1301), the processing ends.

In step S1302, the list edition unit 913 acquires the distribution setting information. In step S1303, the list edition unit 913 checks whether there is the notification setting information of the reception notification of the FAX document in the storage unit 917. If the processing in FIG. 12 is executed, there is the notification setting information of the reception notification of the FAX document in the storage unit 917 (YES in step S1303). The storage unit 917 may store only data updated from the previous processing. If there is the notification setting information of the reception notification of the FAX document in the storage unit 917 (YES in step S1303), the processing shifts to step S1304. If there is not the notification setting information of the reception notification of the FAX document in the storage unit 917 (NO in step S1303), the processing ends.

In step S1304, the list edition unit 913 acquires the notification setting information. In step S1305, the list edition unit 913 compares the acquired distribution setting information with the notification setting information to check whether there is a matching folder therebetween. If the FAX number is '1234' and then the distribution setting information indicates the storage in the folder '1234' and the notification setting information indicates that the reception notification is issued to the PC 803 when the FAX document is stored in the folder '1234', the list edition unit 913 determines that there is the matching folder '1234'.

If the list edition unit 913 determines that there is the matching folder (YES in step S1305), the processing shifts to step S1306. If the list edition unit 913 determines that there is not the matching folder (NO in step S1305), the processing ends.

In step S1306, the list edition unit 913 creates a list associating the FAX number of the sending source corresponding to the folder with a target PC (address of the PC) that sends the reception notification. An example of the result is a record in the correspondence table between the PC and the FAX number of the sending source in FIG. 10. In step S1307, the list sending unit 914 sends the created list to the FAX client 100. In step S1308, the FAX client 100 receives the list. In step S1309, the FAX client 100 stores the list in the memory 304.

Figure 14:
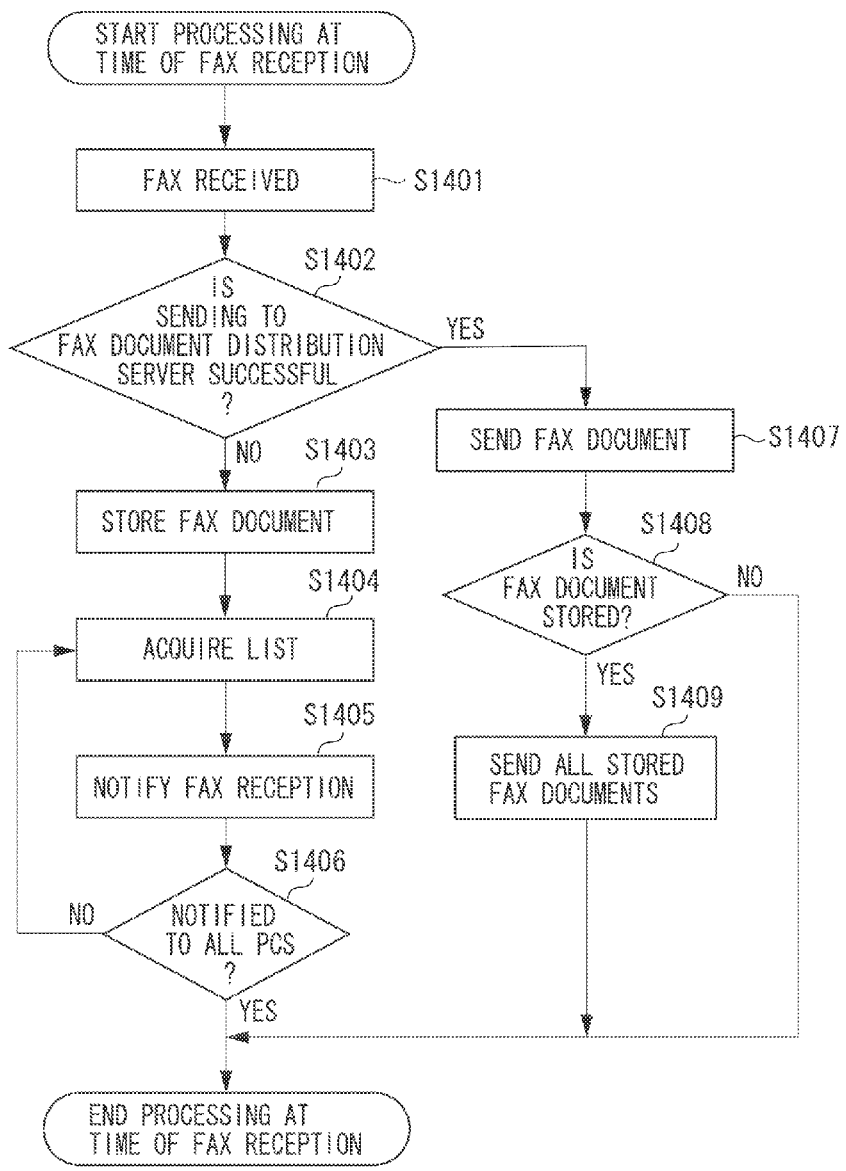
FIG. 14 illustrates an example of a flowchart for processing performed when FAX is received according to the second exemplary embodiment.

FIG. 14 illustrates an example of a flowchart for processing (processing at the FAX reception time) in the FAX client 100 when the FAX document is received. In step S1401, the FAX client 100 receives the FAX document from the FAX server 102, and sends the FAX document to the FAX distribution server 801. In step S1402, the FAX client 100 determines whether sending the FAX document is successful. If the FAX client 100 determines that sending the FAX document is not successful (NO in step S1402), the processing shifts to step S1403. If the FAX client 100 determines that sending the FAX document is successful (YES in step S1402), the processing shifts to step S1407.

In step S1403, the FAX client 100 stores the FAX document in a storage area (memory 304) thereof. Depending on the setting information, the FAX document can be printed on a sheet and be output. In step S1404, the FAX client 100 acquires the list stored by the processing in FIG. 13. In step S1405, the FAX client 100 sends the reception notification to the PC having the FAX number of the sending source of the received FAX document. If the list does not contain the PC tied to the FAX number of the sending source of the received FAX document, the FAX client 100 does not send the reception notification.

In step S1406, the FAX client 100 determines whether sending of the reception notification to all PCs in the list has been completed. If the FAX client 100 determines that sending of the reception notification to all PCs in the list has been completed (YES in step S1406), the processing ends. If the FAX client 100 determines that sending of the reception notification to all PCs in the list has not been completed (NO in step S1406), the processing returns to step S1404.

In step S1407, the FAX client 100 sends the FAX document to the FAX document distribution server 801. In step S1408, the FAX client 100 checks whether the FAX document is stored in the storage area in the processing in step S1403. If the FAX client 100 determines that the FAX document is stored (YES in step S1408), the processing shifts to step S1409. If the FAX client 100 determines that the FAX document is not stored (NO in step S1408), the processing ends. In step S1409, the FAX client 100 sends all FAX documents to the FAX document distribution server 801. Then, the processing ends.

The present exemplary embodiment is not limited to the configurations. The document management server 802 may send the list to the FAX server 102, and the FAX server may use the processing in FIG. 14.

In the configurations as above described, although the FAX document distribution server is down, the MFP sends the reception notification to the PC. As a consequence, the user easily grasps where the FAX document is sent.

In the configurations according to the exemplary embodiment, control is performed to properly receive the reception notification of the FAX information by the information processing apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-148541 filed Jul. 4, 2011, which is hereby incorporated by reference herein in its entirety.

What is claimed is:

1. An information processing apparatus that receives a reception notification of FAX information from a FAX client that receives the FAX information from a FAX server, the FAX server having received the FAX information via a network, the information processing apparatus comprising:
a processor and a memory;
a monitoring unit configured to monitor the FAX client; and
a sending unit configured to read address information of the FAX server from a storage unit when it is determined from a monitoring result of the monitoring unit that the FAX client is not operative and to send, to the FAX server, address information of the information processing apparatus and address information of the FAX client for registering, in the FAX server, the address information of the information processing apparatus and the address information of the FAX client,
wherein the FAX server sends to the information processing apparatus a reception notification of the FAX information designated to be transferred to the FAX client, the reception notification being sent based on the address information of the information processing apparatus and the address information of the FAX client which is received from the information processing apparatus and which has been registered in the FAX server,
wherein at least one of the monitoring unit and the sending unit is implemented by the processor and the memory.

2. The information processing apparatus according to claim 1, wherein the sending unit further sends to the FAX server a request for deleting the address information of the information processing apparatus and address information of the FAX client which was previously registered when it is determined from the monitoring result of the monitoring unit that the FAX client is operative.

3. An information processing apparatus that receives a reception notification indicating that FAX information is received from a FAX client that receives the FAX information from a FAX server, the FAX server having received the FAX information via a network, the information processing apparatus comprising:
a processor and a memory;
a monitoring unit configured to monitor the FAX client;
a sending unit configured to read address information of the FAX server from a storage unit when it is determined from a monitoring result of the monitoring unit that the FAX client is not operative and to send, to the FAX server, address information of the information processing apparatus and address information of the FAX client for registering, in the FAX server, the address information of the information processing apparatus and the address information of the FAX client; and
a reception unit configured to receive, from the FAX server, a reception notification indicating that the FAX information which is designated to be transferred to the FAX client has been received when the address information of the information processing apparatus and the address information of the FAX client has been registered in the FAX server before the FAX server receives the FAX information,
wherein at least one of the monitoring unit, the sending unit, and the reception unit is implemented by the processor and the memory.

4. A FAX server comprising:
a processor and a memory;
a reception unit configured to receive FAX information via a network;
a transfer unit configured to transfer the FAX information to a FAX client when the FAX information designated to be transferred to the FAX client is received by the reception unit and the FAX client is determined to be operative to receive the FAX information, and to store the FAX information in a storage unit when the FAX client is determined to not be operative to receive the FAX information; and
a sending unit configured to determine, when the FAX client is determined to not be operative to receive the FAX information, whether the storage unit stores, in association with each other, address information of an information processing apparatus designated to receive, from the FAX client, a reception notification indicating that the FAX client has received the FAX information designated to be transferred to the FAX client, and address information of the FAX client, and when it is determined by the sending unit that the address information of the information processing apparatus and address information of the FAX client are stored in association with each other in the storage unit, the sending unit is further configured to read the address information of the information processing apparatus from the storage unit, and to send, to the information processing apparatus, the reception notification indicating that the reception unit has received the FAX information designated to be transferred to the FAX client,
wherein at least one of the reception unit, the transfer unit, and the sending unit is implemented by the processor and the memory.

5. A FAX reception notification control method of an information processing apparatus that receives from a FAX client a reception notification of FAX information issued by a FAX client that receives the FAX information from a FAX server that receives the FAX information via a network, the FAX reception notification control method comprising:
monitoring the FAX client; and
reading address information of the FAX server from a storage unit when it is determined from a result of the monitoring that the FAX client is not operative, and sending, to the FAX server, address information of the information processing apparatus and address information of the FAX client for registering, in the FAX server, the address information of the information processing apparatus and the address information of the FAX client,
wherein the FAX server issues, to the information processing apparatus, a reception notification of the FAX information which is designated to be transferred to the FAX client that has been received, based on the address information of the information processing apparatus and the address information of the FAX client which is received from the information processing apparatus and which has been registered in the FAX server.

6. A FAX reception notification control method of an information processing apparatus that receives a reception notification indicating that FAX information is received from a FAX client that receives the FAX information from a FAX server, the FAX server having received the FAX information via a network, the FAX reception notification control method comprising:

monitoring the FAX client;

reading address information of the FAX server from a storage unit when it is determined from a result of the monitoring that the FAX client is not operative, and sending, to the FAX server, address information of the information processing apparatus and address information of the FAX client for registering, in the FAX server, the address information of the information processing apparatus and the address information of the FAX clients; and in response to the server receiving the FAX information which is designated to be transferred to the FAX client when the FAX server stores the previously-registered address information of the information processing apparatus and the address information of the FAX client, receiving, from the FAX server by the information processing apparatus, a reception notification indicating that the FAX information is received by the FAX server.

7. A FAX reception notification control method comprising:

receiving via a network FAX information for a designated FAX client;

transferring the received FAX information to the designated FAX client when it is determined that the FAX information can be transferred to the designated FAX client, and storing the FAX information in a storage unit when it is determined that the FAX information cannot be transferred to the designated FAX client; and when it is determined that the FAX information cannot be transferred to the designated FAX client, determining whether the storage unit stores, in association with each other, address information of an information processing apparatus designated to receive, from the FAX client, a reception notification indicating that the designated FAX client has received the FAX information, and address information of the designated FAX client, and when it is determined that the address information of the information processing apparatus and the address information of the designated FAX client is stored in the storage unit, reading the address information of the information processing apparatus from the storage unit, and using the address information to send to the information processing apparatus, a reception notification indicating that the FAX information is received.

8. A non-transitory computer-readable storage medium that stores a program for enabling a computer that receives from a FAX client a reception notification of FAX information issued by the FAX client that receives the FAX information from a FAX server that receives the FAX information via a network to execute:

monitoring the FAX client; and when it is determined from a result of the monitoring that the FAX client is not operative, reading address information of the FAX server from a storage unit and sending, to the FAX server, address information of the computer and address information of the FAX client for registering, in the FAX server, the address information of the information processing apparatus and the address information of the FAX client, wherein, when it is determined that the address information of the computer and the address information of the FAX client have been previously received from the computer and registered in the FAX server, when the FAX server receives the FAX information which is designated to be transferred to the FAX client, the FAX server issues a reception notification to the computer of the FAX information to be transferred to the FAX client.

9. A non-transitory computer-readable storage medium that stores a program for enabling a computer that receives, from a FAX client, a reception notification indicating that FAX information is received by the FAX client that receives the FAX information from a FAX server that receives the FAX information via a network to execute:

monitoring the FAX client;

when it is determined from a result of the monitoring that the FAX client is not operative, reading address information of the FAX server from a storage unit and sending, to the FAX server, address information of the computer and address information of the FAX client for registering, in the FAX server, the address information of the information processing apparatus and the address information of the FAX client; and in response to the reception by the FAX server of FAX information which is designated to be transferred to the FAX client, when it is determined that the FAX server stores the previously-registered address information of the computer and address information of the FAX client, receiving, by the computer from the FAX server, a reception notification indicating that the FAX information designated to be transferred to the FAX client has been received by the FAX server.

10. A non-transitory computer-readable storage medium that stores a program for enabling a computer to execute:

receiving FAX information via a network;

transferring, to a FAX client designated for receipt of the FAX information, the received FAX information when it is determined that the FAX information can be transferred from the computer to the designated FAX client, and storing the FAX information in a storage unit when the FAX information cannot be transferred from the computer to the designated FAX client; and when it is determined that the FAX information cannot be transferred from the computer to the designated FAX client, determining whether the storage unit stores, in association with each other, address information of an information processing apparatus designated to receive, from the designated FAX client a reception notification indicating that the FAX information designated for receipt by the designated FAX client has been transferred from the computer to the designated FAX client, and address information of the designated FAX client, and when it is determined that the two items of address information are stored in the storage unit in association with one another, reading the address information of the information processing apparatus from the storage unit, and sending, from the computer to the information processing apparatus, a reception notification indicating that the FAX information designated for receipt by the FAX client is received.

* * * * *